No. 871,397. PATENTED NOV. 19, 1907.
J. J. GLAUSER.
REFRIGERATING APPARATUS.
APPLICATION FILED MAR. 22, 1904.
2 SHEETS—SHEET 1.
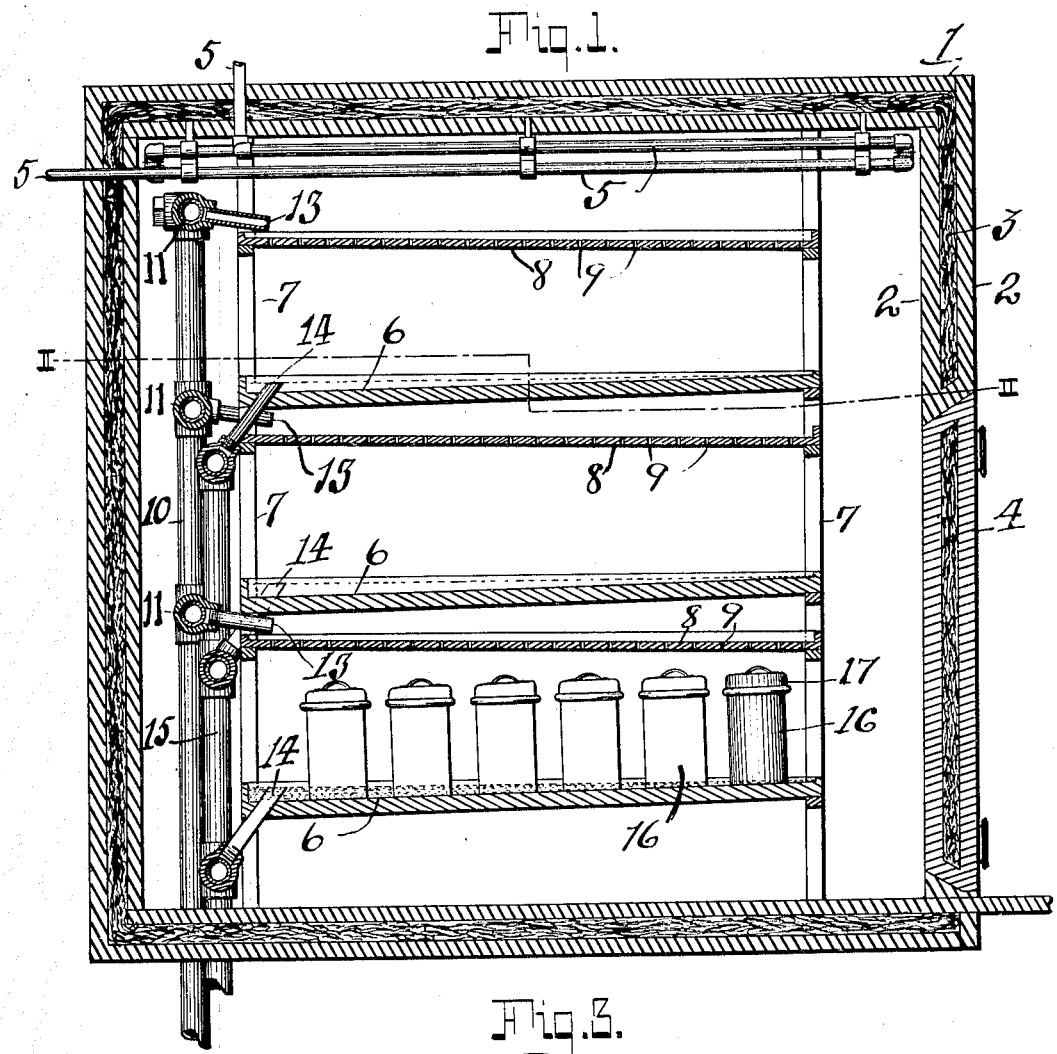
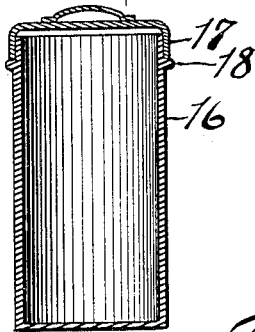
WITNESSES
INVENTOR

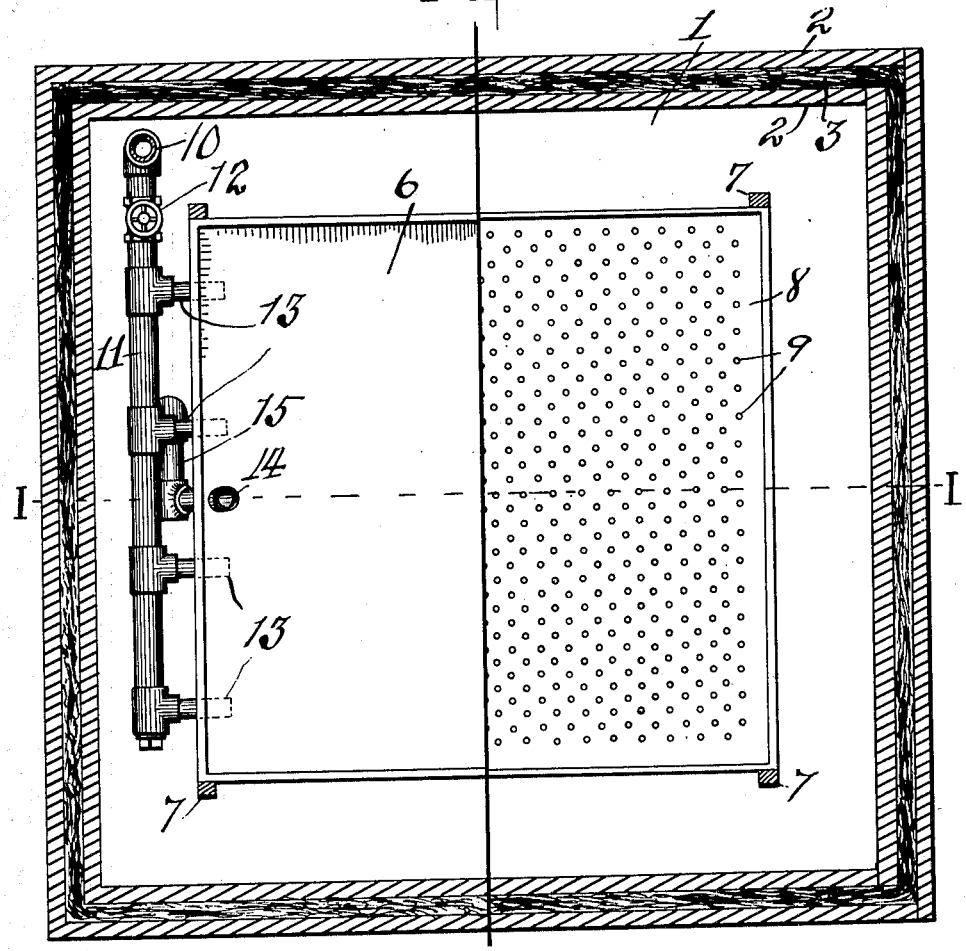

UNITED STATES PATENT OFFICE.

JOHN J. GLAUSER, OF PITTSBURG, PENNSYLVANIA, ASSIGNOR TO THE EDWARD E. RIECK COMPANY, OF PITTSBURG, PENNSYLVANIA, A CORPORATION.

REFRIGERATING APPARATUS.

No. 871,397.  Specification of Letters Patent.  Patented Nov. 19, 1907.

Application filed March 22, 1904. Serial No. 199,347.

*To all whom it may concern:*

Be it known that I, JOHN J. GLAUSER, a citizen of the United States, and residing at the city of Pittsburg, in the county of Allegheny and State of Pennsylvania, have invented or discovered new and useful Improvements in Refrigerating Apparatus, of which the following is a specification.

In the accompanying drawings Figure 1, is a vertical section of a refrigerating compartment fitted with my invention, along the line I—I in Fig. 2; Fig. 2 is a horizontal section of the same along the line II—II in Fig. 1, and Fig. 3 is a vertical section of the form of receptacle I prefer to use.

My invention, generally stated, consists in a new and improved apparatus for the storage and refrigeration of food products of all kinds, such as meats, fruits or vegetables, but for the sake of clearness I have described it as adapted to the storage of ice-cream or ices. After the freezing of the ice-cream it is desirable to store the same in a convenient manner and to effect its final hardening before its delivery to the consumer. My invention, briefly, consists in placing the same in receptacles of convenient form and size and subjecting the receptacles to the spraying or downward drip or flow of brine or similar refrigerating fluid.

The following is a detailed description of the drawings which are intended to illustrate the principles of my invention;—

1 is a refrigerating compartment or chamber, which may be of any convenient size and design to correspond to the particular use required. I have shown the walls thereof composed of two thicknesses of wood or other suitable material, 2—2, with a layer of non-heat-conducting material such as cork, 3, interposed between the same.

4 is a door to provide access to the compartment. It is of course evident that compartment 1 may be constructed of any suitable material as desired and may be lined with galvanized iron.

5—5 illustrate a system of pipes through which a cooling medium such as ammonia gas may be forced, thus enabling a low temperature at all times to be maintained within compartment 1.

Within compartment 1 I prefer to provide a number of shelves, 6—6, which may be horizontal but I prefer to give them a slight slant for the purpose of drainage. Said shelves may be supported from the walls of the compartment 1, if desired, but I prefer for convenience of access, to support them by means of a rack or vertical supports, 7—7. Above each shelf, at a sufficient height to permit the placing of receptacles on shelves 6—6, I provide a similarly supported distributing shelf 8. Said distributing shelves 8—8 are provided with perforations, 9—9, for the purpose below described.

10 is an inlet pipe connected to the supply of brine, through which said brine is pumped.

11—11 are horizontal pipes connected therewith and supplied, preferably, with regulating valves, 12—12.

13—13 are distributers through which the brine in pipes 11—11 is discharged onto the distributing shelves 8—8. The said distributers are preferably provided with suitable means, not shown, to discharge the brine evenly over the surfaces of the distributing shelves so that the entire shelf will be provided with a sufficient supply. The number of distributers, 13—13, discharging on each shelf 8 is regulated by the area of said shelf and the amount of brine which it is desired to pass through the apertures in said shelf 8 upon the receptacles sitting on shelf 6 just below. I prefer to slant said distributing shelves, 8—8, away from the distributers, 13—13, slightly to aid in flowing the brine evenly over the shelf before it drips through the apertures 9—9. 14—14 are drain pipes leading from shelves 6—6, which shelves are, preferably, slanted slightly toward said drains to aid in their action. However I prefer to extend the upper extremities of drain pipes 14—14 somewhat above the level of shelves 6—6 as shown so that a standing level of brine is maintained on said shelves as shown in dotted lines in Fig. 1, the shelves 6—6 being inclosed by sides as shown in Figs. 1 and 2 to form a shallow pan. Said pipes 14—14 connect with drain 15 which in turn leads back to the brine supply, or if desired to a sewer.

16—16 are receptacles, illustrated in the form of cylindrical ice-cream cans, but it is understood that any style or shape may be used as desired or found convenient in the storage of different articles or products. These receptacles are filled with the material to be stored and are then placed on shelves 6—6 beneath the perforations 9—9 in shelves 8—8. It is evident that the brine discharged upon shelves 8—8 would drip or flow down through perforations 9—9 upon said receptacles and be deposited upon shelves 6—6 whence it would drain off through drain pipes 14—14. This action of the brine will result in effective refrigeration of the contents of the receptacles 16—16. I prefer to provide receptacles 16—16 with removable covers, 17—17, which may be simply slipped vertically upon the receptacles or provided with screw-thread engagement with said receptacles, as desired. As the tendency of the brine dripping from the covers of the receptacles is to be diverted from the sides of said receptacle I prefer to provide said receptacles with a lip or shoulder, 18, against which the lower edge of the cover rests, which lip is provided with a lower rounded or inclined surface retreating to the side of the receptacle so that the descending brine is led inwardly and runs down along the sides of the receptacle, thus giving the contents thereof the full effect of the refrigerating brine.

The number and size of the perforations in shelves 8—8 are controlled by the requirements of the particular use to which the mechanism is to be put. For a lower temperature larger or more numerous, or both, perforations would be necessary as, all things being equal, the greater the flow of brine over the receptacles, the greater the cooling effect. These considerations also determine the temperature of the brine introduced and also the quantity. Although any character of brine may be used, for the purposes described I prefer to make use of brine of calcium chlorid on account of the lower temperature thereby procurable.

It will be of course understood that where the nature of the substance to be stored permits a waterproof covering may be substituted for the receptacles or where the substance would not be injured by contact with the refrigerating liquid the covering might be done away with and the same would be still within my claims. In case food products such as meat is to be stored, hooks would be provided to support the cuts, if desired, instead of shelves 6—6.

From the above it is evident that my system is not only convenient but economical to a great degree, insomuch as the usual packing in salt and cracked ice is done away with and the consequent waste of melted material obviated, while the brine which I use may be circulated through the brine supply and refrigerating mechanism an innumerable number of times without waste. By my system much less brine is required and its action is more perfect than if I placed my receptacles in a brine vat, as is now done by some manufactures of ice cream.

What I desire to claim is:—

1. In refrigerating apparatus, a compartment, a plurality of inclined perforated distributing shelves, adapted to produce a downward flow of refrigerating liquid, located within said compartment, inlets for said refrigerating liquid located at the higher sides of said distributing shelves, storage shelves for the reception of articles to be refrigerated, one of said storage shelves being located beneath each distributing shelf and means for draining the liquid from said compartment.

2. In refrigerating apparatus, a compartment, inclined perforated distributing shelves fixed in said compartment and adapted to produce a downward drip of refrigerating liquid, inlets for said liquid at the higher sides of said shelves, means for exposing the articles to be refrigerated beneath said distributing shelves to said drip and means for draining said liquid from said compartment, substantially as described.

Signed at Pittsburg, Pa. this 18th day of March 1904.

JOHN J. GLAUSER.

Witnesses:
EDWARD A. LAWRENCE,
J. H. HARRISON.